April 18, 1933.  B. F. SINGER ET AL  1,904,015
SAFETY DEVICE
Filed Aug. 17, 1931  3 Sheets-Sheet 1
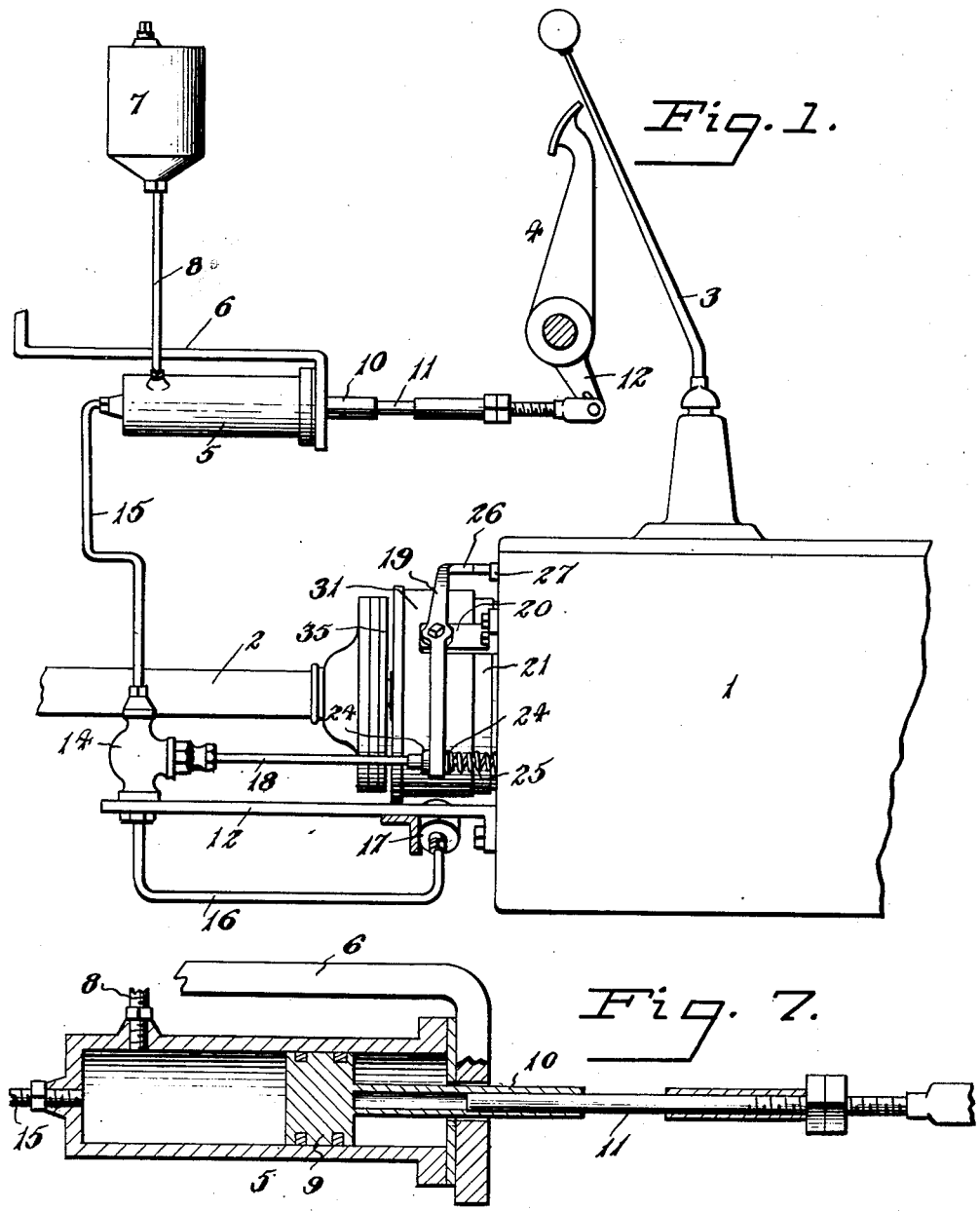
Inventor
B. F. Singer
J. J. Ehemann
By Lacey & Lacey, Attorneys

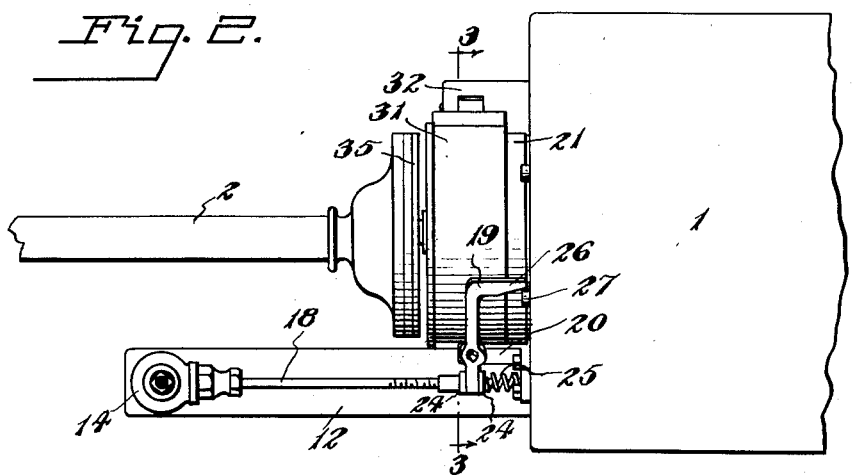
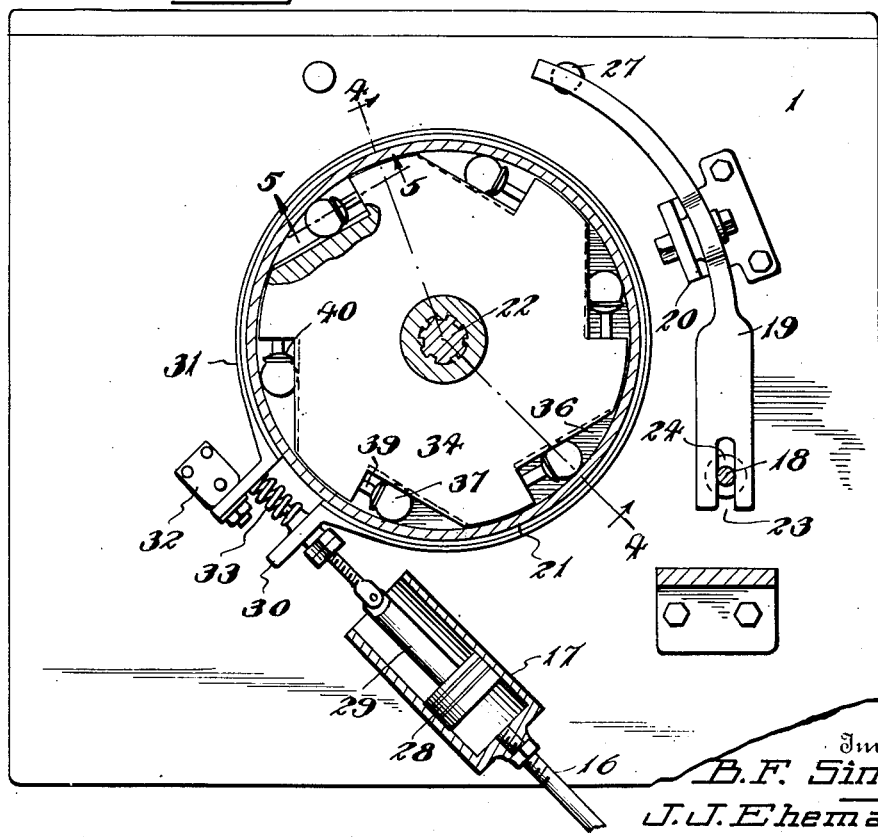

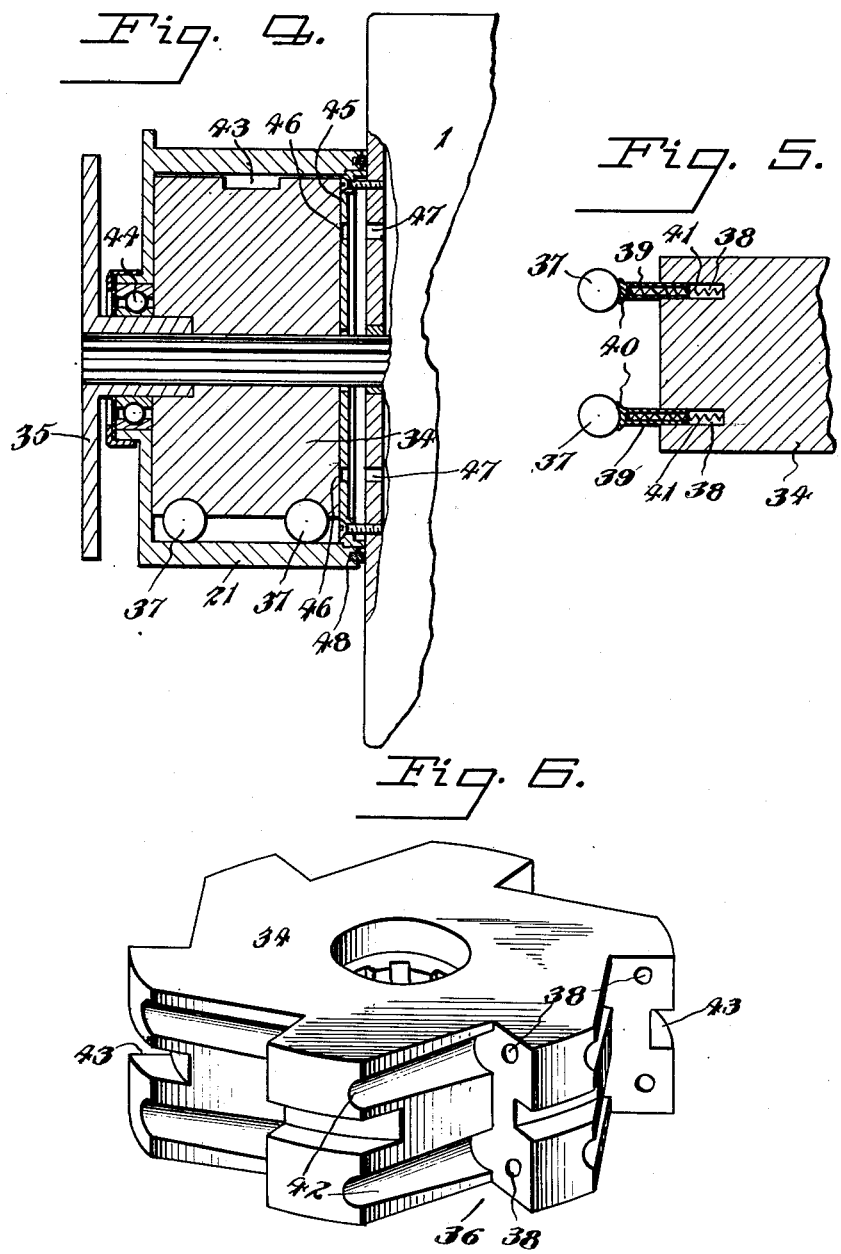

Patented Apr. 18, 1933

1,904,015

UNITED STATES PATENT OFFICE

BENJAMIN F. SINGER AND JOSEPH J. EHEMANN, OF LANCASTER, PENNSYLVANIA

SAFETY DEVICE

Application filed August 17, 1931. Serial No. 557,820.

This invention is a safety device for use upon automobiles whereby reverse motion of the automobile will be normally prevented but may be permitted when desired. It is a very general practice of motorists to ascend hills or rising grades at high speed, but it frequently becomes necessary to shift into low speed gear before the top of the hill is reached, and unless the shifting is accomplished skillfully and promptly the momentum of the car is apt to be arrested and back motion of the car set up. Many disastrous accidents have been due to this cause, and it is the object of the present invention to provide a mechanism whereby when the momentum of the car is temporarily arrested the car will be automatically held against reverse travel, but the locking or braking mechanism may be released when transmission gearing is shifted into reverse. The stated object and other objects which will hereinafter incidentally appear are attained in such mechanism as is illustrated in the accompanying drawings, and the invention resides in certain novel features which will be particularly pointed out in the appended claims.

In the drawings,

Figure 1 is an elevation, with parts in section, of so much of the operating mechanism of an automobile as is necessary to an understanding of the invention, Fig. 2 is a view partly in top plan and partly in horizontal section of the same, Fig. 3 is an enlarged transverse section on the line 3—3 or Fig. 2, Fig. 4 is a detail section on the line 4—4 of Fig. 3, Fig. 5 is a detail section on the line 5—5 of Fig. 3, Fig. 6 is a perspective view of the hub or disk member, and Fig. 7 is a horizontal section through the pump or pressure cylinder.

In the annexed drawings, the reference numeral 1 indicates the transmission casing of an automobile from which the propeller shaft 2 extends rearwardly, the propeller shaft being connected with the transmission shaft by a universal joint in the usual manner. The reference numeral 3 designates the gear shifting lever, and the numeral 4 designates the clutch pedal, all of which parts may be of the usual or any approved construction and arrangement.

In carrying out the present invention, a pump cylinder 5 is carried by a bracket 6 of any suitable form, which may be secured upon the chassis or body or some other relatively fixed part of the automobile, and connected with this cylinder 5 is a tank or reservoir 7, the pipe 8 which connects the tank with the cylinder serving to convey oil from the tank, as will be understood. A piston 9 is mounted in the cylinder and has a hollow stem 10 projecting through the front end of the cylinder, and a push rod 11 fits telescopically within the hollow piston rod, as shown clearly in Fig. 7, and is pivoted at its front extremity to the lower end of a lug or extension 12 which is formed on the clutch pedal or on the clutch pedal fulcrum so that the movements of the pedal will be transmitted to the push rod and to the piston at times. Secured to the rear end of the transmission casing is a bracket or supporting arm 12 carrying a cut-off valve 14, of any approved construction, which is connected with the rear end of the cylinder 5 through a pipe 15, as clearly shown in Fig. 1, a second pipe 16 extending from the outlet side of the valve to a cylinder 17 which is supported in any convenient manner adjacent the end of the transmission casing. The stem 18 of the valve extends forwardly to be connected to a rocking arm or lever 19 which is fulcrumed upon a lug or bracket 20 on the transmission casing, as shown in Figs. 2 and 3, this rocking arm or lever being curved or bent to conform to a casing 21 which is supported loosely upon the transmission casing concentric with the rear end of the transmission shaft 22, as will be understood upon reference to Fig. 3. The lower end of the lever 19 is forked or slotted, as shown at 23 in Fig. 3, so that it spans the rod or stem 18 and engages between the stop collars 24 on said rod, whereby any rocking of the lever will be transmitted to the valve rod or stem to open or close the valve 14, the valve being held normally closed by an expansion spring 25 which is disposed between the forward end of the valve stem and the end of the transmission casing and is held in place in any convenient manner. The upper extremity of the lever 19 is turned forwardly, as shown at 26, and is disposed in the path of the shifting rod 27 which forms a part of the gear shifting mechanism, and the extremity of the lever is beveled, as shown most clearly in Fig. 2, so that it will be easily engaged by said rod.

Mounted within the cylinder 17 is a piston 28 from which a piston rod 29 extends to and through the open upper end of the cylinder and is connected to the lug 30 at one end of a brake band 31 which encircles the casing 21, as shown and as will be understood. The opposite end of the brake band 31 is secured to an anchoring lug 32 on the transmission casing, and an expansion spring 33, fitted between and supported by the ends of the band, holds the ends thereof normally in spread relation so that the casing or drum 21 will be free to move. Within the casing or drum 21 a hub or disk 34 is splined upon the shaft 22 to rotate therewith, the forward member 35 of the universal joint having a boss extending into the hub or disk 34 and also keyed to the shaft, as will be understood upon reference to Fig. 4. The periphery of the disk or hub 34 has recesses 36 formed therein, the walls of these recesses being at right angles, as clearly shown in Fig. 3, and the recesses forming, with the wall of the drum or casing 21, triangular chambers in each of which are disposed balls 37. The shorter wall of each recess is disposed radially of the hub or disk, and in said wall, adjacent the opposite sides of the disk, are sockets 38 which receive tubular stems 39, as shown in Fig. 5. Each stem 39 carries a concave plate or cup 40 at its outer end which is adapted to bear against the adjacent ball 37 and tends to press the latter toward the point of the triangular recess under the influence of an expansion spring 41 which is mounted in the respective socket 38 and within the tubular stem, as shown clearly in Fig. 5. The springs are thus held against distortion and also act freely in projecting the presser stems and cups. Upon referring to Figs. 4 and 5 more particularly, it will be noted that two balls 37 are provided in each triangular chamber and in the longer tangential wall of the chamber are grooves 42 forming runways for the balls. The disk or hub 34 is also provided with peripherally extending grooves or recesses 43 which form communication between adjacent triangular chambers and thereby prevent a locking of the parts through a tendency of the same to attempt compression of the oil or lubricant in which the hub or disk works.

An anti-friction bearing 44 is provided for the casing or drum 21 around the boss or hub of the member 35, and the end of the casing presented to the transmission casing is closed by a cap plate or disk 45 having openings 46 therethrough. Similar openings 47 are formed in the end of the transmission casing so that a flow of lubricant from the latter through the casing 21 and back to the transmission may occur, and a felt washer 48 is interposed between the two casings to prevent dissipation of the oil. The plate 45 is secured to the casing 1 and fits within the edge of the drum or casing 21, as shown in Fig. 4.

It will be noted that the push rod 11 has some lost motion or free play in the hollow piston rod 10 so that the ordinary movements of the clutch pedal will not affect the piston 9, but if the clutch pedal be forced down to the limit of its movement in order to open the clutch the push rod will be caused to drive the piston 9 toward the rear end of the cylinder 5 and thereby place the oil which fills the system under increased pressure. It will also be understood that the movements of the gear shift lever 3 will not affect the rocking arm or lever 26, unless the machine is put in reverse gear. The hub or disk 34 rotates anti-clockwise, as it appears in Fig. 3, to drive the car ahead and, consequently, it will not cause the rollers 37 to bind between itself and the drum or casing 21, but if the disk be rotated clockwise, the rollers will tend to move to the points of the respective triangular chambers and, therefore, bind therein between the disk and the casing, which is held stationary, and arrest the rotation of the parts. Oil is poured into the tank 7 while the valve 14 is held open until the cylinder 5, at the rear of the piston 9, and the pipes 15 and 16 are completely filled and the pressure upon the piston 28 causes the brake band to clamp the casing or drum 21 and hold said casing or drum firmly against rotation, whereupon the valve 14 is permitted to close and the parts are then in normal condition. As long as the machine is at rest or is traveling in a forward direction, the rollers 37 will be inactive, but if, while the gearing is in neutral or set to drive ahead, the machine should start to move backwardly, the rollers 37 will bind and will arrest the movement, as has been stated, because the brake band holds the casing or drum stationary. If it is desired to travel in reverse, the shift lever 3 is set in the proper position, and this shifting of the lever will cause the shift rod 27 to move rearwardly and engage the rock arm or lever 26 so as to rock the same and exert a pull upon the stem 18 which will fully open the valve 14. The clutch pedal 4 is, of course, pushed down to the limit of its movement while the gears are being shifted and, consequently, the piston 9 will act upon the oil or other fluid in the system so that if the valve 14 should happen to open an additional quantity of the fluid will be forced into the cylinder 17 and drive the piston 28 toward the open end thereof so that the brake band 31 will be tightened around the casing or drum 21 and the machine, therefore, held against reverse movement during gear shifting. After the shifting into reverse has been accomplished, the clutch pedal is, of course, released and the back pressure of the fluid will be accommodated by the now fully opened valve 14 and will cause the piston 9 to follow the clutch and move forwardly, the pressure upon the piston 28 being relieved so that the brake band will be released under the influence of the spring 33, whereupon the machine may travel rearwardly, the drum or casing 21 turning with the hub or disk 34. When the car is to go forward, the clutch pedal is pushed down to the limit of its movement thereby restoring the maximum pressure to the cylinder 17 and locking the brake band around the drum 21. Then the lever 3 is moved out of reverse, whereupon the rod 27 will release the rocking arm 19 and the spring 25 will close the valve 14 so that the brake band 31 will remain locked to the drum or casing 21 until the parts are again shifted to permit travel in reverse.

Having thus described the invention, we claim:

1. In an apparatus for the purpose set forth, a cylindrical casing, means whereby the casing may be held against rotation, a disk mounted concentrically within the casing and provided in its periphery with recesses forming with the casing triangular chambers, the disk being further provided in its periphery with annularly extending grooves forming communication between the recesses, and rolling elements disposed in the respective recesses and adapted to bind between the disk and the casing to prevent relative rotation thereof.

2. In apparatus for the purpose set forth, the combination with a reverse gear of an automobile and the clutch pedal of the automobile, of a ratchet mechanism normally permitting movement in a forward direction and preventing movement in a reverse direction, a brake band encircling said ratchet mechanism, a fluid pressure cylinder adjacent said mechanism, a piston in said cylinder connected with said brake band to hold the band to the ratchet mechanism and maintain normal operation of said mechanism, means controlled by the clutch pedal to temporarily prevent release of the fluid pressure, and means controlled by the reverse gear for normally holding said fluid pressure means active and effecting release of the same when the reverse gear is set to operate.

3. The combination of a ratchet mechanism normally permitting forward travel and preventing reverse travel, of a fluid pressure cylinder, a pedal-operated piston in said cylinder, a second cylinder adjacent the ratchet mechanism, a piston in said second cylinder, a brake band encircling the ratchet mechanism and connected with the last-mentioned piston whereby to maintain the ratchet mechanism in operative position, means establishing communication between the two cylinders whereby fluid pressure may be established and maintained in the second-mentioned cylinder against the piston therein, a valve interposed in said communicating means, means for holding the valve normally closed, and means operated by a reverse gear element to open said valve whereby to effect reduction of the pressure in the second cylinder and release the brake band.

4. In apparatus for the purpose set forth, the combination of a fluid pressure means for permitting or preventing reverse travel, a valve located in said means having an extended stem, a rocking arm having one end engaged with said stem and its opposite end disposed in the path of a reverse gear shifting rod, and yieldable means acting on the stem to hold the valve normally closed.

5. The combination of a transmission casing, a brake mechanism mounted thereon and including a case having an open end, and a closure secured on the transmission casing and fitting in the open end of the brake mechanism case, there being openings in the closure and the end of the transmission casing for circulating lubricant through the brake mechanism.

In testimony whereof we affix our signatures.

JOSEPH J. EHEMANN. [L. S.]
BENJAMIN F. SINGER. [L. S.]